(12) United States Patent
Urquizo et al.

(10) Patent No.: US 6,701,379 B1
(45) Date of Patent: Mar. 2, 2004

(54) METHOD AND APPARATUS FOR IDENTIFYING A NETWORKED CLIENT MODEM

(75) Inventors: Alex Urquizo, Chelmsford, MA (US); Kevin Riley, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 723 days.

(21) Appl. No.: 09/586,255

(22) Filed: May 31, 2000

(51) Int. Cl.$^7$ .............................. G06F 15/16; G06F 3/00
(52) U.S. Cl. .............................. 709/250; 709/227; 710/8
(58) Field of Search ................................ 709/250, 228, 709/227; 370/352; 710/8

(56) References Cited

U.S. PATENT DOCUMENTS

| | | | | |
|---|---|---|---|---|
| 6,076,106 A | * | 6/2000 | Hamner et al. | 709/223 |
| 6,098,116 A | * | 8/2000 | Nixon et al. | 710/8 |
| 6,122,639 A | * | 9/2000 | Babu et al. | 707/103 R |
| 6,128,662 A | * | 10/2000 | Bolton et al. | 709/228 |
| 6,269,481 B1 | * | 7/2001 | Perlman et al. | 717/178 |
| 6,351,771 B1 | * | 2/2002 | Craddock et al. | 709/227 |
| 6,501,750 B1 | * | 12/2002 | Shaffer et al. | 370/352 |
| 6,594,707 B1 | * | 7/2003 | Rubinstein et al. | 709/250 |

* cited by examiner

*Primary Examiner*—Krisna Lim
(74) *Attorney, Agent, or Firm*—Hickman Palermo Truong & Becker LLP

(57) ABSTRACT

A method and apparatus for identifying one or more characteristics of a networked device, such as a client modem, is disclosed. Values of one or more components of a signal from an unknown device are compared to values of the same components of signals from known devices. Matches determined by this comparison identify characteristics, such as the manufacturer, of the unknown devices to be the same as characteristics of the matched known devices. The comparison values are determined by receiving signals from known devices, and identifying and cataloging values of the one or more signal components in association with characteristics of the known devices. The identified characteristics are stored and later can be accessed or manipulated to derive additional information, such as statistical information based on the characteristics identified for multiple unknown devices.

79 Claims, 7 Drawing Sheets

METHOD AND APPARATUS FOR IDENTIFYING A NETWORKED CLIENT MODEM

FIELD OF THE INVENTION

The present invention relates generally to management of computer networks. The invention relates more specifically to a method and apparatus for identifying characteristics of client modems in a managed network.

BACKGROUND OF THE INVENTION

A computer network typically includes one or more server elements that service client entities based upon requests or instructions from the client entities. In a dial-up network configuration, a client entity may include a client application that can communicate with the server entities through a client signal modulator-demodulator ("client modem"). A server entity can include, or have between it and the client entity, an access server which can perform one or more operations based upon signals being sent to the server entity, for example from the client entities. For example, in the process of communication between the client entity and the server entity, the client modem may send a signal that is received by the access server. The access server then utilizes information of the signal to facilitate communication between the client entity and the server entity.

In some instances, the communication between the client and server entities can fail. This may be due to one or more of several possible factors. For example, the communication failure can be due to characteristics of one of the devices in the signal path between the client and server, such as the client modem. However, a network manager cannot always determine why, where, or how the failure occurred. In this context, "network manager" refers broadly both to persons responsible for network management, and network management software or systems.

Even if the category of failed device (e.g., the client modem) is suspected or known to contribute to the failure, the specific type of device within that category may not be known. For example, in a distributed system where the client is not under the same control as is the server, it may be impossible to determine what type of modem failed, only that some modem failed. In internetworking, for example, certain Internet Service Providers (ISPs) may be unwilling to disclose what kind of modems are used in their facilities.

If a network manager could determine the specific manufacturer or model of a modem that has failed or contributed to a failure, then the network manager could target modems of that manufacturer or model for testing, repair, improvement, accommodation, or other management.

Modems that transmit data at 56 kilobits (Kb) per second using the V.90 standard are now widely used in network computing. V.90 is a standard, approved by the International Telecommunications Union (ITU), for transmitting data downstream to modems at 56 Kbps. However, presently, there is no practical way to determine what manufacturer is associated with a failed or failing client modem that is connected to a server using a V.90 connection.

Based on the foregoing, there is a clear need in this field for a method and system for identifying a network device.

In particular, there is a need for a method or apparatus that can identify the make or model of a modem in a network that has failed or is suspected of contributing to a failure. There is a specific need for such a method or apparatus that operates in conjunction with modems that interacted with access servers in managed networks. There is an additional need to provide such a method and system while minimizing complexity and maximizing efficiency.

SUMMARY OF THE INVENTION

The foregoing advantages, and other advantages that will become apparent from the following description, are achieved by the present invention, which comprises, in one aspect, a method and apparatus for identifying one or more characteristics of a networked device, such as a client modem. Values of one or more components, of a signal from an unknown device are compared to values of the same components of signals from known devices. Matches determined by this comparison identify characteristics, such as the manufacturer or model, of the unknown devices to be the same as characteristics of the matched known devices. The comparison values are determined by receiving signals from known devices, and identifying and cataloging values of the one or more signal components in association with characteristics of the known devices. The identified characteristics are stored and later can be accessed or manipulated to derive additional information, such as statistical information based on the characteristics identified for multiple unknown devices.

In one aspect, the invention provides a method of determining and storing a value of a characteristic of a device in a network, comprising the steps of receiving a signal from the device, wherein the signal is uniquely characterized by at least one signal parameter; identifying at least one value of at least one pre-selected signal parameter in the signal; and determining, based on a reference table that associates device characteristics with signal parameters, at least one characteristic of the device.

In another aspect, the invention provides a method of determining a manufacturer associated with an V.90 modem in a network, the method comprising the computer-implemented steps of receiving a message from the modem during a Training Phase of an V.90 session between the modem and a router; identifying a DIL descriptor in the message received from the modem; comparing a Sign Pattern value and a Training Pattern value of the DIL descriptor to a reference table that associates DIL descriptor values with manufacturer information; and determining the manufacturer associated with the V.90 modem based on matching manufacturer information in the reference table.

The foregoing should be understood as merely a brief summary of selected aspects and features of the invention that does not limit the scope of the invention. Many other features and aspects that are not summarized here will become apparent from the following detailed description.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus is described for identifying a networked client modem. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Structural Overview

Figure 1:
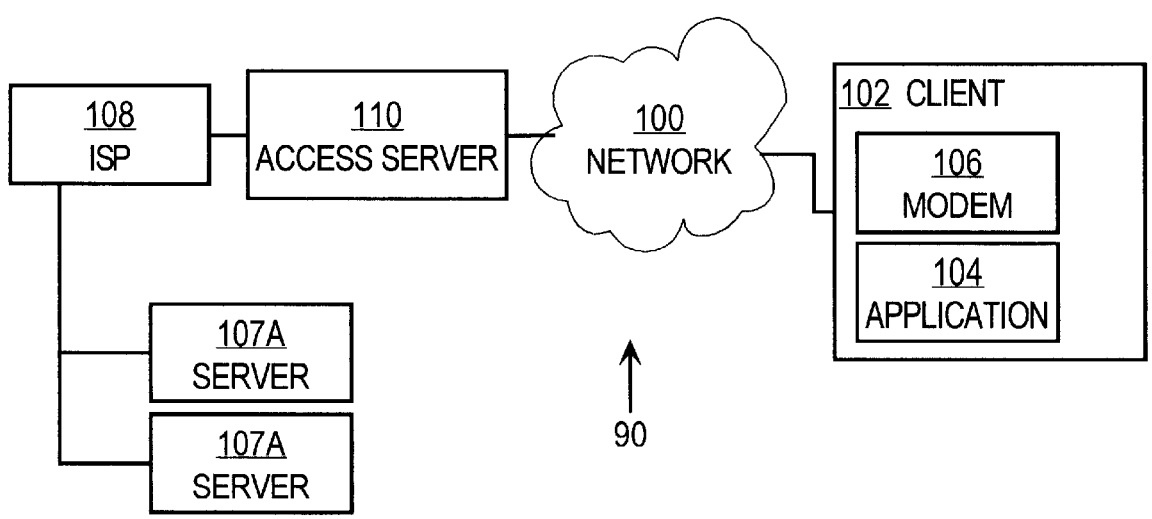
FIG. 1 is a block diagram of a representative network with which an embodiment of the invention may be used.

FIG. 1 is a representative network configuration 90 with which an embodiment of the invention may be used.

Generally, network 100 is coupled, directly or indirectly, to a client 102. Network 100 may be a local area network, wide area network, one or more internetworks, or the global, packet-switched internetworks known as the Internet. Client 102 is a network end station device such as a personal computer, workstation, etc., that receives services from one or more servers that logically separated from the client. Client 102 includes one or more client software applications 104, and a client modem 106 for communicating with network 100. The client application 104 can be any suitable application that uses a device, such as client modem 106, to communicate through the network to acquire one or more services.

The client modem 106 can be any suitable device for facilitating communication between the client application 104 and the network 100. For example, the client modem 106 can be any suitable device with operative components manufactured by, for example, Rockwell, U.S. Robotics/3Com, Lucent, and Pctel. Components or products of other than these four modem manufacturers may be used. In the preferred embodiment, client modem 106 conforms to the ITU V.90 standard.

Figure 6:
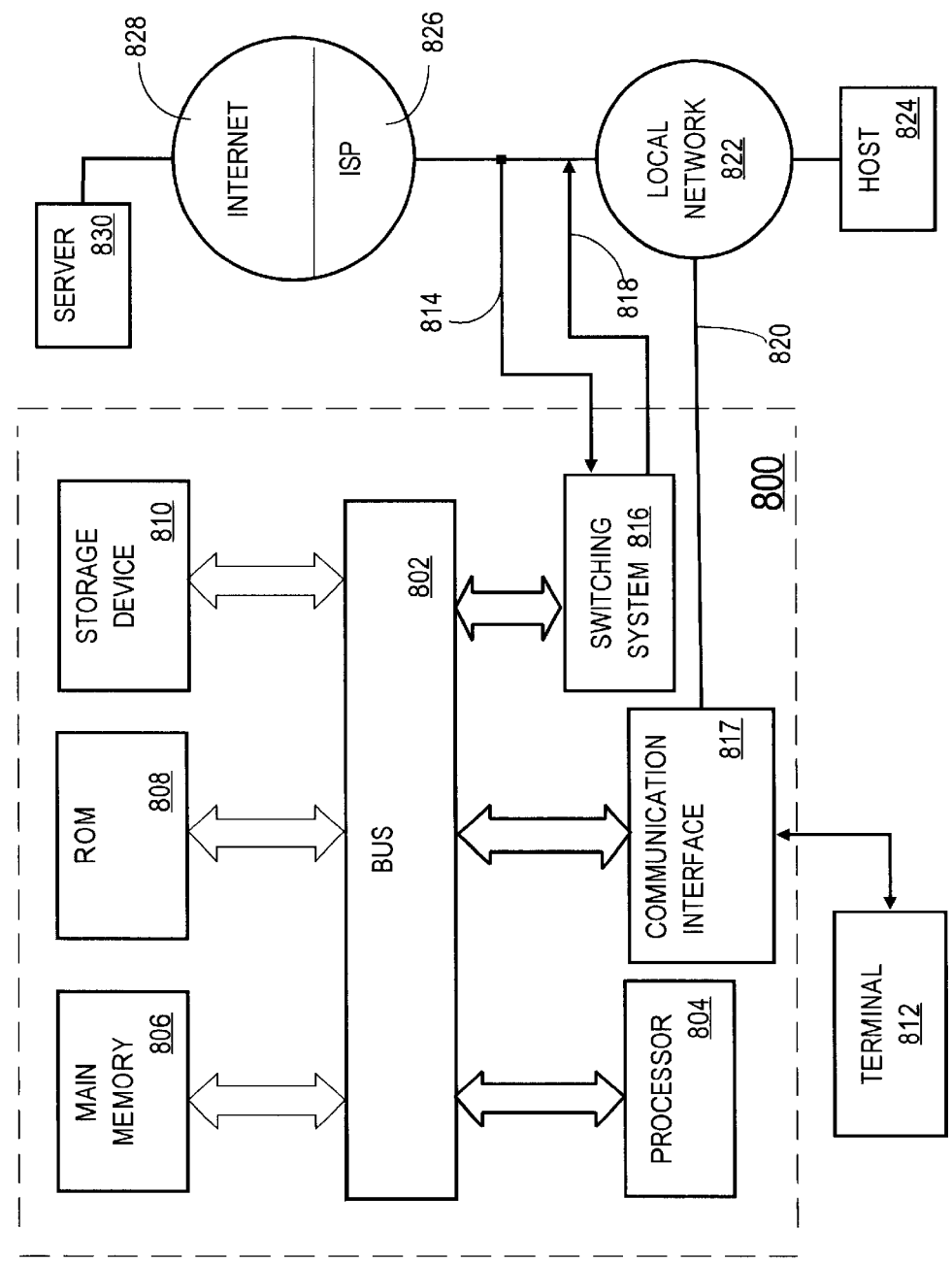
FIG. 6 is a block diagram of a computer system with which an embodiment can be implemented.

One or more servers 107A, 107B and an Internet Service Provider (ISP) 108, are also coupled to or accessible through network 100. Between the network 100 and ISP 108 is connected an Access Server 110. In a preferred embodiment, Access Server 110 is implemented in the form of a router having suitable application programs that implement access control features. Examples of commercial products that are suitable for use as Access Server 110 include Cisco 2500 Access Server Series, Cisco 6700 Series Integrated Access Devices, Cisco AS5300 Universal Access Server, etc., all available from Cisco Systems, Inc., San Jose, Calif. The network 100, client 102, ISP 108, and Access Server 110 can be connected in any way suitable to facilitate desired communication between them. For example, the modes of connection, and thereby communication, described below with reference to FIG. 6, are applicable to the configuration 90 represented in FIG. 1. In this configuration, Access Server 110 manages access of clients to ISP 108.

Access Server 110 includes software elements that communicate with the ISP 108 at the network layer of the OSI network reference model and software elements that communicate with the network 100 at the data link layer and physical layer. Embodiments of the invention may be implemented through computer program code or software elements of Access Server 110 and operable at the physical layer.

Figure 2:
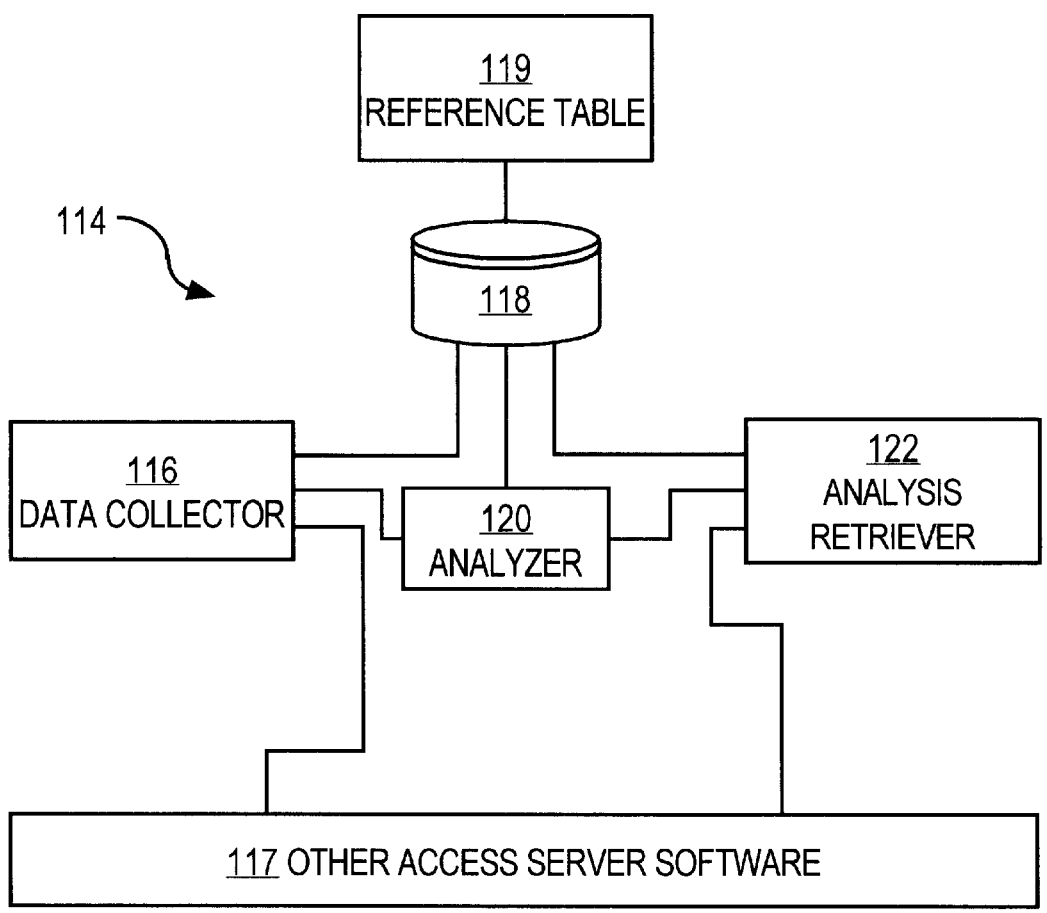
FIG. 2 is a schematic of one aspect implemented in the physical layer of a router.

FIG. 2 is a schematic of one aspect of the present invention as implemented in software elements operable at the physical layer of a network connection using Access Server 110.

A software system 114 of FIG. 2 includes a Data Collector 116, storage 118, and an Analyzer 120, each of which is implemented in the form of one or more software elements that is callable or otherwise accessible by other software elements of Access Server 110, as represented by block 117 of FIG. 2. Optionally, system 114 includes an Analysis Retriever 122.

Data Collector 116 is connected with the Analyzer 120. The Data Collector 116 interacts with the network 100, receiving and detecting signals received by the Access Server 110 of FIG. 1. The Data Collector 116 also identifies and extracts components of such received signals according to pre-defined rules or instructions. Analyzer 120 performs operations using the signals or signal components identified or extracted by the Data Collector 116. Both the Data Collector 116 and Analyzer 120 are connected with storage 118. With these connections the Data Collector 116 can place the detected signals or signal components within storage 118, or the analysis results of the Analyzer 120 can be placed in storage 118.

In one preferred embodiment, storage 118 includes a reference table 119 that associates one or more modem make or model values with sets of Digital Impairment Learning ("DIL") descriptor values. In this context, "modem make or model value" refers to one or more data values that uniquely identify a chipset, but not necessarily a brand name or manufacturer, of a particular V.90 modem. Each DIL descriptor consists of a plurality of fields of information that are unique to each modem manufacturer.

The DIL descriptor values are used to generate a test signal to characterize the digital impairments on the link between modem and server. In a V.90 session, upon receiving a DIL descriptor value, the access server decodes the descriptor, determines what data to send back to the modem, and sends a waveform back to the modem. The modem then compares the received data to what it expected to receive, in order to identify any problems in the line or connection. Accordingly, once appropriate values are stored in reference table 19, the reference table 119 can be used to determine the make or model of a modem in a network connection based on a comparison of DIL descriptor values to columns of the reference table.

When Analysis Retriever 122 is included in system 114, Analysis Retriever 122 can receive signals from either the network 100 of FIG. 1 or the ISP 108 of FIG. 1 to initiate analysis retrieval. In turn, the Analysis Retriever 122 can communicate with the Analyzer 120 to initiate analysis by the Analyzer 120 based on information stored within storage 118. Alternatively or in addition, the Analysis Retriever 122 can retrieve one or more data stored within storage 118. This data can include, for example, signals detected by Data Collector 116, signal components extracted by Data Collector 116, analysis based on a signal or extracted signal components, or analysis based upon signals or signal components from multiple signals.

Functional Overview

Figure 3:
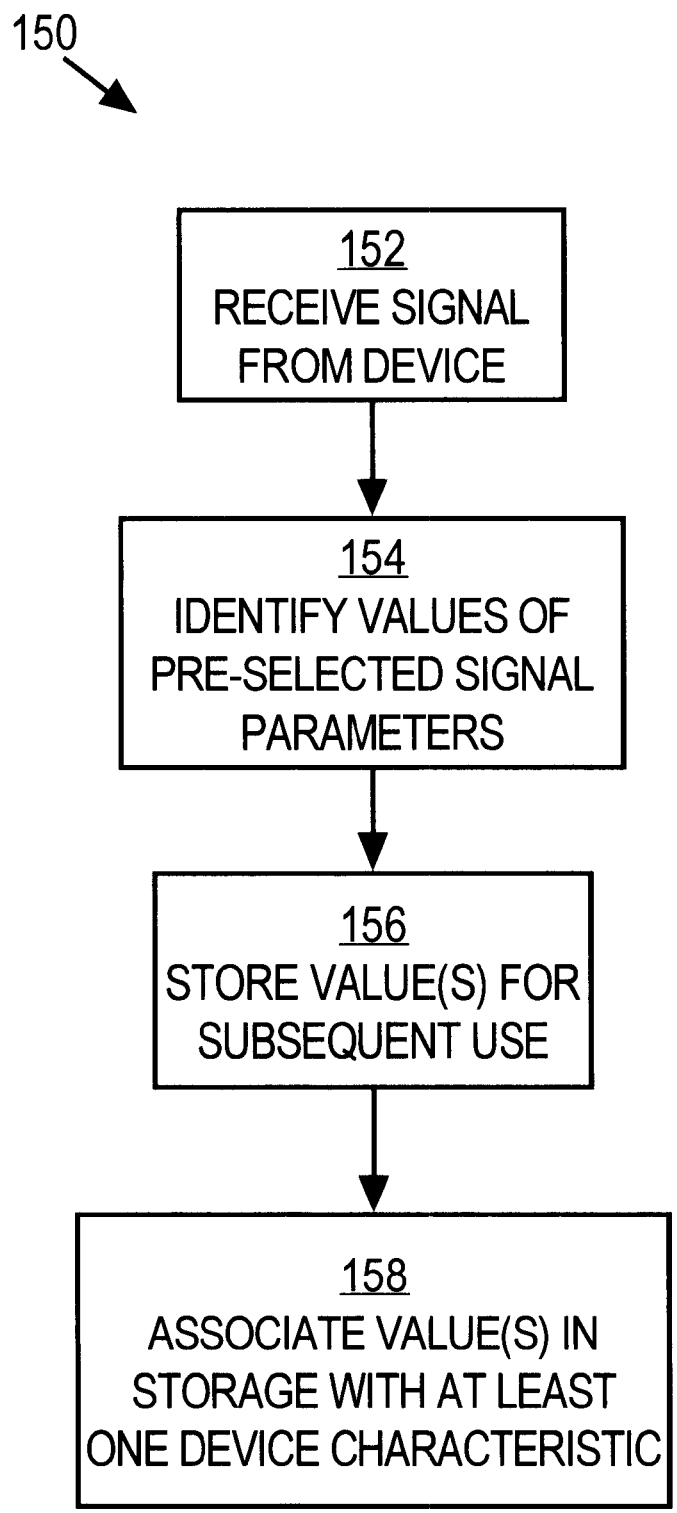
FIG. 3 is a block diagram of a method of determining and storing a characterization of a network device.

FIG. 3 is a block diagram of a method 150 of determining and storing a characterization of a network device. In one embodiment, method 150 may be used to create and store reference table 119 before the reference table is used in determining the make or model of a modem that is operating in a live connection.

In block 152, a signal is received from a device, for example, a modem.

In block 154, one or more values of pre-selected signal parameters of the signal received in block 152 are identified in block 154. In an exemplary embodiment, the signal received in block 152 can be a signal received from a modem and conforming to the V.90 standard.

Transmission according to the V.90 standard generally occurs in a plurality of phases. Typically four (4) phases of negotiation are carried out between modem and server in order to arrive at a steady state in which data may be transmitted. The phases include V8bis/V.8 negotiation, line probing, half duplex training, full duplex training, and steady state. The third phase or half duplex training phase is of particular interest for purposes of this document.

In the past, traditional voiceband modem standards have required a modem to transmit a mandatory training pattern of bit values. Because the training pattern is the same for all modems of all manufacturers that conform to the standard, determining the manufacturer or type of modem during a call has been difficult, if not impossible. Under the V.90 standard, however, a modem vendor may uniquely design a portion of the training pattern to suit their needs, and many vendors have done so. During the training phase of a V.90 transaction, a V.90 modem sends a "Ja" signal to the access server. The "Ja" signal includes a DIL value.

Thus, as one specific example, in block 152, the DIL descriptor is received from the modem. Although the DIL descriptor comprises a plurality of data values, a subset of the data values are sufficient to carry out modem identification. Thus, the pre-selected signal parameters can be, for example, the Training Pattern values, and the Sign Pattern values of a V.90 modem transaction. Generally, the Training Pattern and Sign Pattern values comprise up to eight (8) 16-bit word values. In a preferred embodiment, values of the first two (2) words of the Sign Pattern and the first two (2) words of the Training Pattern of a V.90 transaction are detected and used as keys to determine a manufacturer of a modem. These word values have been found in practice to represent a "signature" that generally uniquely indicates a particular modem manufacturer, because the values of such words do not vary as much among modem manufacturers as do other words in the DIL descriptor of an V.90 transaction.

The foregoing values are provided only as examples. Additional or alternative components of the DIL descriptor can be pre-selected as the signal parameters for which values are identified in block 154. In particular, the signal parameters pre-selected can be any one or more signal parameters that can facilitate the unique identification of one or more device characteristics from which the device is received in block 152.

In block 156, the values identified in block 154 are stored. Block 156 may involve storing the values in a table of a database, in a scratchpad area of main memory, or any other suitable form of storage in which the values are available for subsequent use. The database can be of any suitable form for later retrieval of the values stored therein. For example, the database can be a relational database, or an object-oriented database, or any other suitable database configuration.

In block 158, the values identified in block 154 are associated with at least one device characteristic. The characteristic referenced in block 158 is at least one characteristic of the device from which the signal is received in block 152. In method 150, the device and its characteristics are known in advance and are therefore available to be associated with the values identified in block 154. Thus, block 158 may involve manually storing known values in reference table 119, e.g., in a laboratory setting, configuration session, etc. Such device characteristics can include, for example, the manufacturer of one or more components of the modem, or the model identification number of the device. For example, the modem manufacturer can be identified as "Rockwell", "USR/3Com", "Lucent", "PCtel," etc. The type of device characteristics, as well as the various possibilities for each characteristic, depend on the type of signal received in block 152, the pre-selected signal parameters, and the values that are identified in block 154.

Figure 4A:
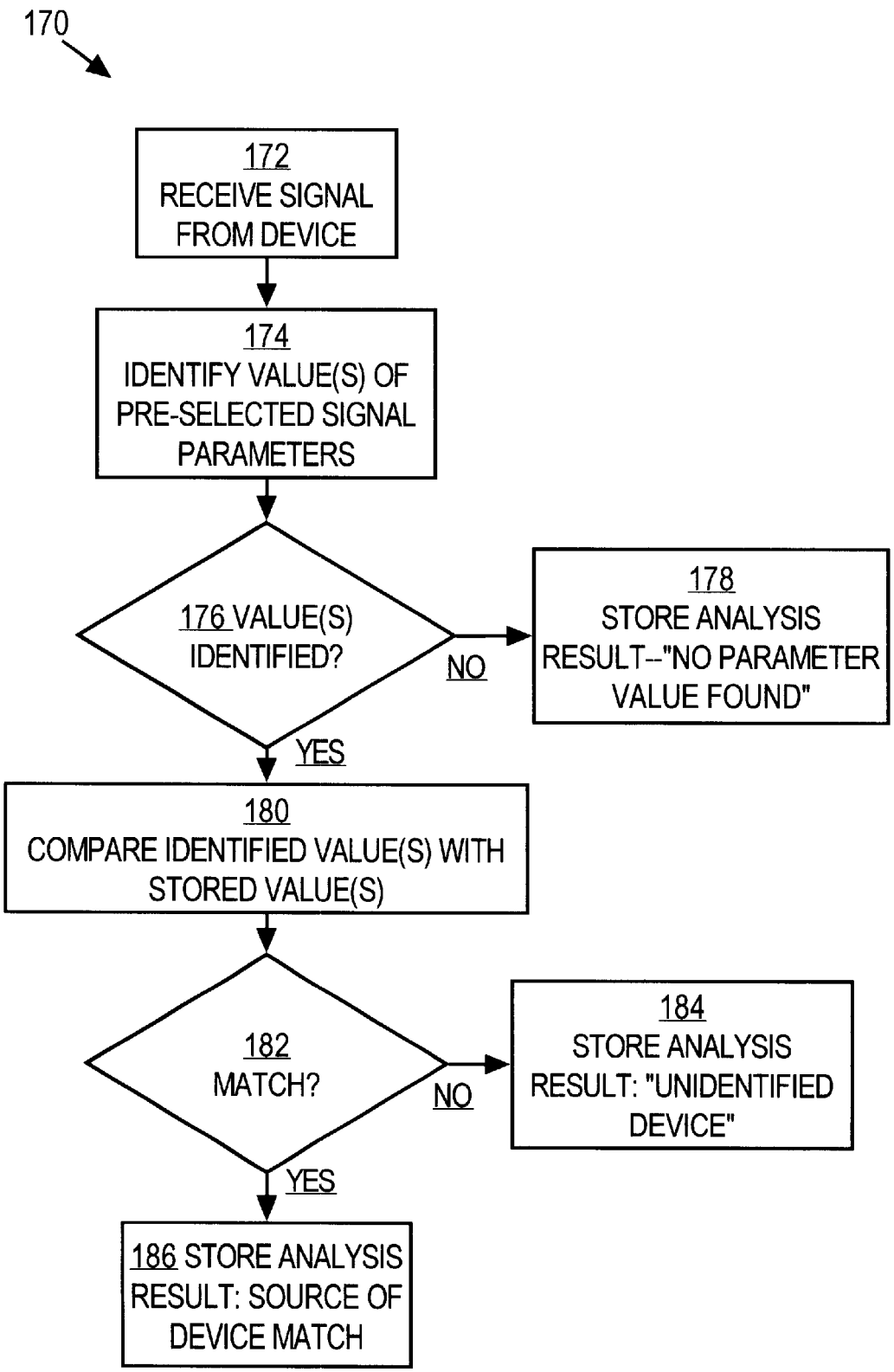
FIG. 4A is a block diagram of a method of identifying a network device.

FIG. 4A is a block diagram of a method 170 of identifying a network device. In one embodiment, using the method of FIG. 4A, a first device from among two communicating devices can identify the make or model of the second device, during a training phase, based on a unique signal that is sent by the second device. In a preferred embodiment, the second device is a modem.

A signal is received from a network device in block 172. In this case of method 170, the device is an unknown device, for example, a modem. The signal received in block 172 is any suitable signal for which method 170 has been configured. As an example, applicable to where the device is a modem, the signal can be a DIL descriptor value as described with reference to FIG. 3.

In block 174, the values of one or more pre-selected parameters of the signal received in block 172 are identified. As with the example discussed with reference to FIG. 3, the pre-selected parameters can be the training pattern and the sign pattern, but any one or more additional or alternative signal parameters (i.e., components) can be utilized.

In block 176, it is determined whether the values desired to be identified in block 174 were, in fact, identified. If not, an analysis result indicating that no parameter was found is stored in block 178. This analysis result can be stored in a database, such as storage 118 shown in FIG. 2. In one embodiment, in block 176 it can be determined whether all of the intended values were identified. In such a case, method 170 would include block 178, if any one of the intended values was not identified in block 174. In such case, the analysis results stored in block 178 can, in some embodiments, identify for which parameter no value was found, or in other embodiments, can merely identify that not all the values were found.

Alternatively, in other embodiments, it can be determined in block 176 separately for each of the pre-selected signal parameters whether a value was identified. In such embodiments, if a value has not been identified for a pre-selected signal parameter, method 170 continues to block 178 for that pre-selected signal parameter, and then continues back to block 176 for each of the next and subsequent pre-selected signal parameters. In these embodiments, if it is determined in block 176 that a value has been determined for a pre-selected signal parameter, method 170 continues through block 186 and again returns to block 176 for evaluation of any remaining pre-selected signal parameters. This process can continue until the determination of block 176 has been made for each of the pre-selected signal parameters.

As a further alternative, some embodiments can include the identification of values in block 174 for only one pre-selected signal parameter at a time. In such a case, after block 178, 184, or 186, method 170 would return to block 174 for the identification of the value of the next pre-selected signal parameter.

If it has been determined that one or more values have been identified in block 176, the identified value or values are compared with one or more stored values in block 180. These stored values can be those discussed above with respect to FIG. 3, in particular, block 156. Thus, the values identified in block 154 can be used to calculate or generate one or more analysis values/comparison values that can then be compared in block 180 with like values using the mechanism described below. In particular, the values identified in block 154 can be compared to the information in reference table 119 using one or more table lookup operations. Based on the results of the table lookup operations, the make or model of the modem can be determined from the reference table. If no match is found, then the modem make or model is stored using a value that indicates "unknown."

It is determined in block 182 whether a match was found in the comparison of block 180. In some embodiments, a match is an exact equivalent between the two values. IN other embodiments, a match can include a difference of a pre-determined magnitude. For example, a tolerance, bandwidth, or range can be pre-determined to define a match between the identified values and a pre-determined value. In such instances, for example, block 182 can include a determination of the degree or type of match found, if any.

If no match is found in block 182, an analysis result indicating that the device is unidentified is stored in block 184. If the identification of block 176 has been performed for each of the pre-selected signal parameters, method 170 ends, and if the process of block 176 has not been completed for all pre-selected signal parameters, method 170 continues to block 174 or 176 according to the particular embodiment.

If a match is determined to have been found in block 182, an analysis result indicating one or more device characteristics associated with the stored values are stored in block 186. As with block 178, 184, method 170 ends, returns to block 174, or returns to block 176 according to the particular embodiment.

The values identified in block 174 can be used to calculate or generated one or more analysis values or comparison values that may be compared, in block 180, with like values.

If a make or model of a modem or chipset is found successfully, it may be used in a variety of ways by the access server or by the network manager. The make or model information may be stored in the access server, and provided to a network manager or other user in response to existing router commands. For example, a user may enter, at a router terminal using the standard command-line interface (CLI), a CLI command that requests statistics such as the "link stats" command or the "display modem operational status" command. In response, the access server may display the make or model information on the terminal.

The make or model information also may be stored in a modem log that is maintained by the access server for each modem that is managed by the access server. A CLI command, such as "show modem log," can then be used to display the stored information. The modem log generally logs information associated with a connection when a pre-determined event occurs, such as retraining, disconnection, entering the steady state for the first time, etc. Access server software may be modified to cause the access server to store the modem make or model information in the appropriate modem log when the information is determined.

Figure 4B:
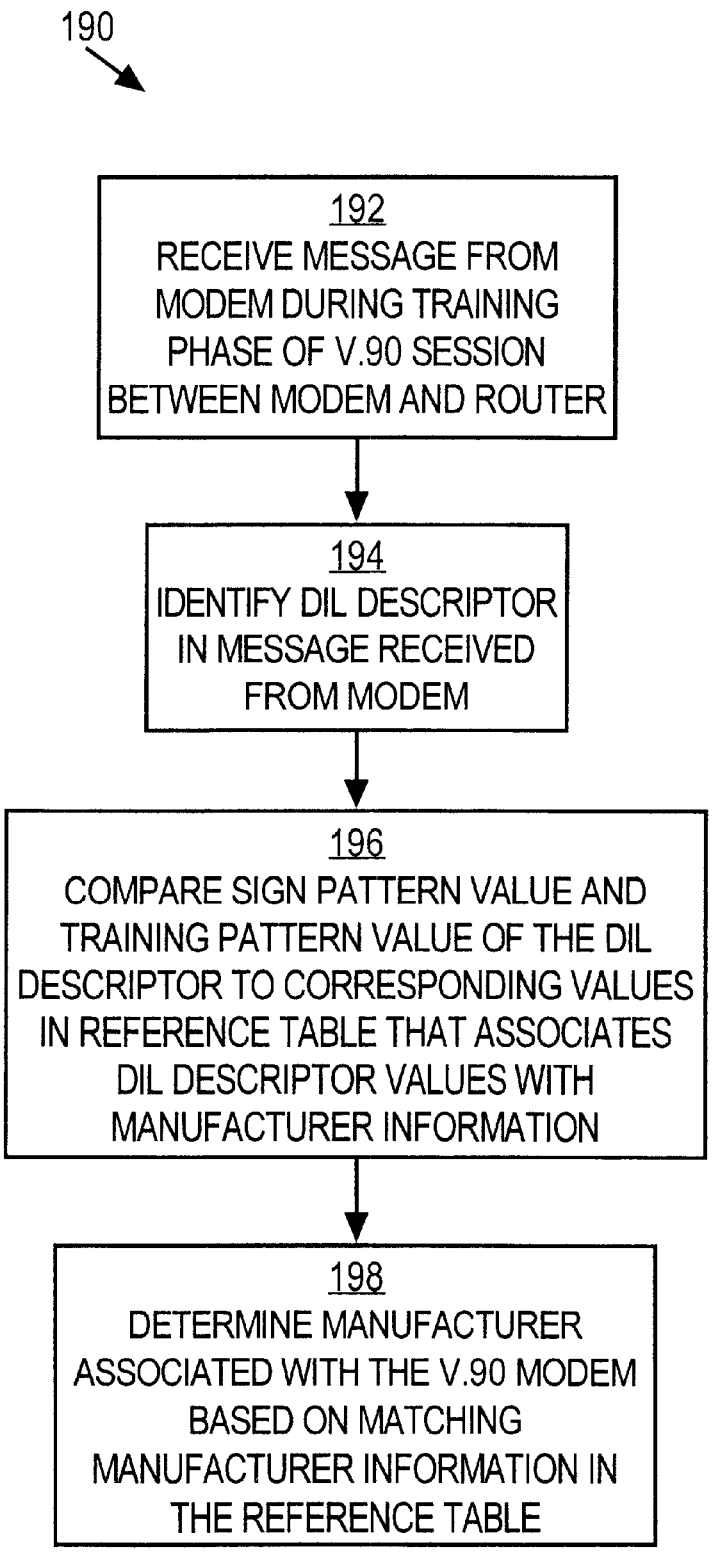
FIG. 4B is a block diagram of an alternative method of identifying a V.90 modem in a network connection

FIG. 4B is a block diagram of an alternative embodiment of a method 190 of determining a manufacturer associated with a V.90 modem in a network.

In block 192, a message is received from the modem during a Training Phase of a V.90 session between the modem and a router. Block 192 may involve causing Access Server 110 to receive a message from an active V.90 session as modem 108 is negotiating a V.90 connection with Access Server 110.

In block 194, a DIL descriptor is identified in the message received from the modem. Block 194 may involve using software elements of Access Server 110 to extract the DIL descriptor from the message that was received in block 192.

In block 196, a Sign Pattern value and a Training Pattern value of the DIL descriptor are compared to corresponding values in a reference table that associates DIL descriptor values with manufacturer information. Block 196 may involve extracting the Sign Pattern values and Training Pattern values, or only selected words from such values, from the DIL descriptor value, and then carrying out a table look-up in reference table 119 for corresponding values.

In block 198, a manufacturer associated with the V.90 modem is determined, based on matching manufacturer information in the reference table. Thus, upon completing block 198, a manufacturer associated with a V.90 modem may be determined based on unique values transmitted during V.90 connection negotiation between Access Server 110 and modem 108.

Figure 5:
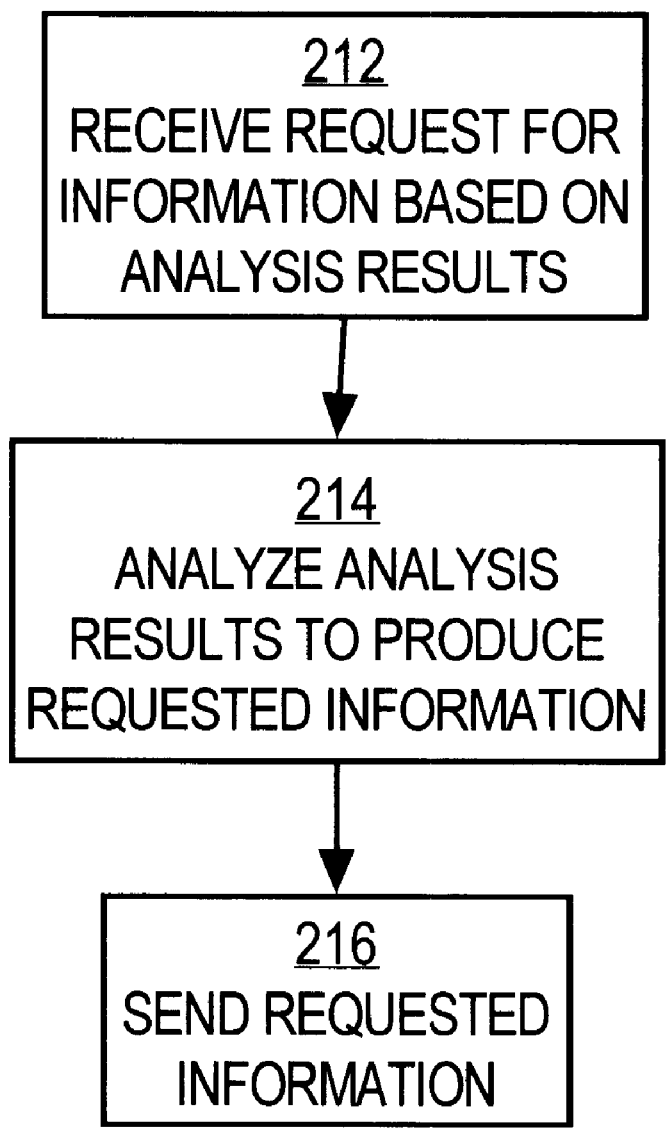
FIG. 5 is a block diagram of a method 210 of providing information regarding one or more unknown devices.

FIG. 5 is a block diagram of a method 210 of providing information regarding one or more unknown devices, for example, statistical information regarding the manufacturer of one or more unknown devices, such as modems.

A request for information based on the analysis results of method 170 of FIG. 4 is received in block 212. The analysis results of method 170 are further analyzed in block 214 to produce the information requested in block 212. For example, the analysis results can be analyzed by totaling the number of devices to be manufactured by each manufacturer. The requested information would then be the total number of unknown devices identified as being made by a first manufacturer, the total number identified as being made by a second manufacturer, etc. The requested information produced in block 214 is then sent in block 216 to an address based upon the request received in block 212. For example, the requested information can be sent to the address from which the request was received in block 212. The requested information can then be used as statistical information, for example, for future decision-making. As a specific example, if the unknown devices are modem devices, and the requested information is the total number of unknown devices identified to be manufactured by each of one or more manufacturers, such data can be correlated with, for example, transmission failure rates associated with the Access Server 110. Other requested information regarding other signals and other devices can be used in other ways to maintain or improve the configuration such as configuration 90 of FIG. 1.

By determining the make or model associated with a modem in a network, a network manager can predict or understand better the behavior of a V.90 modem connection. For example, if the call success rate for V.90 connections managed by an access server is unexpectedly low, the process described herein may be used to determine whether such performance is attributable to modems of a particular chipset, make or model. Various modems from different manufacturers perform differently, and knowing what type of manufacturer is in a connection improves the ability of the network manager to understand an unexpected situation and carry out remote debugging. Additionally, a network manager may use the modem information to determine what client code base is dialing into a remote access server, thereby permitting the network manager to compile usage statistics based on code base.

For example, the processes described herein enable a network manager to modify the configuration of an access server to be tailored to the client code base. By using this process, network managers have a good understanding of the V.90 client modem population accessing their ISPs and therefore provide a known configuration that best fits that particular population. The processes also may be used to provide feedback to the customer about one or more new code bases that are available for their client modems.

Hardware Overview

FIG. 6 is a block diagram that illustrates a computer system 800 upon which an embodiment of the invention may be implemented.

Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for identifying a networked client modem. According to one embodiment of the invention, identifying a networked client modem is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for identifying a networked client modem.

The received code may be executed by processor 804 as it is received, and/or stored in storage device 810, or other non-volatile storage for later execution. In this manner, computer system 800 may obtain application code in the form of a carrier wave.

In summary, the present invention provides methods and apparatuses for identifying network devices such as networked client modems. The invention has been described herein in terms of several specific embodiments. Other embodiments of the invention, including alternatives, modifications, permutations and equivalents of the embodiments described herein, will be apparent to those skilled in the art from consideration of the specification, study of the drawings, and practice of the invention. The specification and drawings are, accordingly, to be regarded in an illustrative rather than a restrictive sense. The embodiments and specific features described above in the specification and shown in the drawings should be considered exemplary rather than restrictive, with the invention being defined by the appended claims, which therefore include all such alternatives, modifications, permutations and equivalents as fall within the true spirit and scope of the present invention.

What is claimed is:

1. A method of determining and storing a value of a characteristic of a device in a network, comprising:

receiving a signal from the device, wherein the signal is uniquely characterized by at least one signal parameter;

identifying at least one value of at least one pre-selected signal parameter in the signal;

determining, based on a reference table that associates device characteristics with signal parameters, at least one characteristic of the device, wherein said signal parameters in the reference table specify characteristics of said signal.

2. A method as recited in claim 1, wherein the device is associated with at least one device manufacturer; wherein the at least one device characteristic includes an associated manufacturer identity value; and wherein the determining step comprises determining the device manufacturer of the device in the network based on the reference table.

3. A method as recited in claim 1, wherein the device is characterized by a model identification value, and the at least one device characteristic includes the model identification value.

4. A method as recited in claim 1, wherein the device is a modem, and wherein the step of receiving the signal includes the step of receiving a DIL descriptor as part of the signal.

5. A method as recited in claim 1, wherein the device is a modem, and wherein the step of receiving the signal includes the step of receiving a DIL descriptor that comprises a plurality of DIL descriptor field values as part of the signal during a training phase of a V.90 modem communication transaction.

6. A method as recited in claim 4, wherein identifying at least one value of the pre-selected signal parameter includes identifying a Training Pattern value of the DIL descriptor and identifying a Sign Pattern value of the DIL descriptor.

7. A method as recited in claim 4, further comprising the steps of:

attempting to identify a value of at least one pre-selected signal parameter;

storing an analysis result that indicates no value was found, when no value is identified; and when at least one value of at least one pre-selected signal parameter is identified:

comparing the at least one value with at least one pre-stored value to determine a match;

storing an analysis result based upon the comparing.

8. A method of identifying a network device, comprising the computer-implemented steps of:

receiving a signal from the network device, wherein the signal is characterized by at least one signal parameter;

attempting to identify a value of at least one pre-selected signal parameter;

storing an analysis result that indicates no value was found, when no value is identified; and when at least one value of at least one pre-selected signal parameter is identified:

comparing the at least one value with at least one pre-stored value to determine a match;

storing an analysis result based upon the comparing;

determining, based on comparing the analysis result to a reference table that associates device characteristics with signal parameters, at least one characteristic of the device.

9. A method as recited in claim 8, wherein the at least one pre-stored value is a value of one of the at least one pre-selected signal parameters of a signal that is associated with a known device, the pre-stored value being associated with a characteristic of the known device.

10. A method as recited in claim 8, wherein a match is determined when the identified value is equivalent to the pre-stored value.

11. A method as recited in claim 8, wherein if no match is determined, the analysis result based upon the comparing indicates the device is unidentified.

12. A method as recited in claim 8, wherein if a match is determined, the analysis result based upon the comparing includes a characteristic of the device, wherein the device characteristic is based on the characteristic of the known device associated with the pre-stored value that is equivalent to the identified value.

13. A method as recited in claim 12, wherein the device is associated with at least one manufacturer, and the characteristic of the device is an associated manufacturer.

14. A method as recited in claim 12, wherein the device is characterized by a model identification, and the characteristic of the device is the model identification.

15. A method as recited in claim 8, wherein the device is a modem, and receiving the signal includes receiving a DIL descriptor.

16. A method as recited in claim 15, wherein attempting to identify a value includes the steps of identifying a value of a Training Pattern of the DIL descriptor and identifying a value of a Sign Pattern of the DIL descriptor.

17. A method as recited in claim 15, wherein attempting to identify a value includes the steps of identifying a value of a first two (2) words of a Training Pattern of the DIL descriptor and identifying a value of a first two (2) words of a Sign Pattern of the DIL descriptor.

18. A method of determining a manufacturer associated with a V.90 modem in a network, the method comprising the computer-implemented steps of:

receiving a message from the modem during a Training Phase of a V.90 session between the modem and a router;

identifying a DIL descriptor in the message received from the modem;

comparing a Sign Pattern value and a Training Pattern value of the DIL descriptor to a reference table that associates DIL descriptor values with manufacturer information; and determining the manufacturer associated with the V.90 modem based on matching manufacturer information in the reference table.

19. A computer readable medium containing program instructions for identifying a network device, wherein when the computer readable medium is read by a computer system having a processor and memory, the program instructions are configured to be executed by the processor, the computer readable medium comprising:

program instructions for receiving a signal from a device, wherein the signal is characterized by at least one signal parameter;

program instructions for attempting to identify a value of at least one pre-selected signal parameter;

program instructions for storing an analysis result indicating no value was found, if no value is identified;

program instructions for comparing the at least one value with at least one pre-stored value to determine a match if at least one value is identified; and program instructions for storing an analysis result based upon the comparing if at least one value is identified.

20. A computer readable medium as recited in claim 19, wherein the program instructions for receiving a signal from a device include program instructions for receiving a signal from a modem, wherein the signal includes a DIL descriptor.

21. A computer readable medium as recited in claim 20, wherein the program instructions for comparing include program instructions for reading a pre-stored value from a database, wherein the pre-stored value is a value of one of the at least one pre-selected signal parameters of a signal that is associated with a known device, the pre-stored value being associated with a characteristic of the known device.

22. A computer readable medium as recited in claim 21, wherein the program instructions for comparing include:

program instructions for determining a match when the identified value is equivalent to the pre-stored value; and program instructions for producing the analysis result to include a characteristic of the device based on the characteristic of the known device associated with the pre-stored value that is equivalent to the identified value.

23. A computer readable medium as recited in claim 19, wherein the program instructions for receiving the signal include program instructions for receiving a DIL descriptor.

24. A computer readable medium as recited in claim 23, wherein the program instructions for attempting to identify a value of at least one pre-selected signal parameter include program instructions identifying a Training Pattern of the DIL descriptor and identifying a Sign Pattern of the DIL descriptor.

25. An apparatus for determining and storing a value of a characteristic of a device in a network, comprising:

means for receiving a signal from the device, wherein the signal is uniquely characterized by at least one signal parameter;

means for identifying at least one value of at least one pre-selected signal parameter in the signal;

means for determining, based on a reference table that associates device characteristics with signal parameters, at least one characteristic of the device, wherein said signal parameters in the reference table specify characteristics of said signal.

26. An apparatus as recited in claim 25, wherein the device is associated with at least one device manufacturer; wherein the at least one device characteristic includes an associated manufacturer identity value; and wherein the means for determining comprises means for determining the device manufacturer of the device in the network based on the reference table.

27. An apparatus as recited in claim 25, wherein the device is characterized by a model identification value, and the at least one device characteristic includes the model identification value.

28. An apparatus as recited in claim 25, wherein the device is a modem, and wherein the means for receiving the signal comprises means for receiving a DIL descriptor as part of the signal.

29. An apparatus as recited in claim 25, wherein the device is a modem, and wherein the means for receiving the signal includes the step of receiving a DIL descriptor that comprises a plurality of DIL descriptor field values as part of the signal during a training phase of a V.90 modem communication transaction.

30. An apparatus as recited in claim 28, wherein the means for identifying at least one value of the pre-selected signal parameter comprises means for identifying a Training Pattern value of the DIL descriptor and identifying a Sign Pattern value of the DIL descriptor.

31. An apparatus as recited in claim 28, further comprising:

means for attempting to identify a value of at least one pre-selected signal parameter;

means for storing an analysis result that indicates no value was found, when no value is identified;

means for comparing the at least one value with at least one pre-stored value to determine a match when at least one value of at least one pre-selected signal parameter is identified; and means for storing an analysis result based upon the comparing when at least one value of at least one pre-selected signal parameter is identified.

32. An apparatus that can determine and store a value of a characteristic of a device in a network, comprising:

a network interface;

a processor coupled to the network interface and receiving a stream of data from the network;

a memory coupled to the processor and comprising a plurality of sequences of program instructions which, when executed by the processor, cause the processor to carry out the steps of:

receiving a signal from the device, wherein the signal is uniquely characterized by at least one signal parameter;

identifying at least one value of at least one pre-selected signal parameter in the signal;

determining, based on a reference table that associates device characteristics with signal parameters, at least one characteristic of the device, wherein said signal parameters in the reference table specify characteristics of said signal.

33. An apparatus as recited in claim 32, wherein the device is associated with at least one device manufacturer; wherein the at least one device characteristic includes an associated manufacturer identity value; and wherein the determining step comprises determining the device manufacturer of the device in the network based on the reference table.

34. An apparatus as recited in claim 32, wherein the device is characterized by a model identification value, and the at least one device characteristic includes the model identification value.

35. An apparatus as recited in claim 32, wherein the device is a modem, and wherein the step of receiving the signal includes the step of receiving a DIL descriptor as part of the signal.

36. An apparatus as recited in claim 32, wherein the device is a modem, and wherein the step of receiving the signal includes the step of receiving a DIL descriptor that comprises a plurality of DIL descriptor field values as part of the signal during a training phase of a V.90 modem communication transaction.

37. An apparatus as recited in claim 36, wherein identifying at least one value of the pre-selected signal parameter includes identifying a Training Pattern value of the DIL descriptor and identifying a Sign Pattern value of the DIL descriptor.

38. An apparatus as recited in claim 36, wherein the plurality of sequences of program instructions, when executed, further cause the processor to perform the steps of:
   attempting to identify a value of at least one pre-selected signal parameter;
   storing an analysis result that indicates no value was found, when no value is identified; and
   when at least one value of at least one pre-selected signal parameter is identified:
      comparing the at least one value with at least one pre-stored value to determine a match;
      storing an analysis result based upon the comparing.

39. An apparatus that can determine and store a value of a characteristic of a device in a network, comprising:
   a network interface;
   a processor coupled to the network interface and receiving a stream of data from the network;
   means coupled to the processor for receiving a signal from the device, wherein the signal is uniquely characterized by at least one signal parameter; p1 means coupled to the processor for identifying at least one value of at least one pre-selected signal parameter in the signal;
   means coupled to the processor for determining, based on a reference table that associates device characteristics with signal parameters, at least one characteristic of the device, wherein said signal parameters in the reference table specify characteristics of said signal.

40. A computer-readable medium carrying one or more sequences of instructions for determining and storing a value of a characteristic of a device in a network, wherein execution of the one or more sequences of instructions by one or more processors causes the one or more processors to perform the steps of:
   receiving a signal from the device, wherein the signal is uniquely characterized by at least one signal parameter;
   identifying at least one value of at least one pre-selected signal parameter in the signal;
   determining, based on a reference table that associates device characteristics with signal parameters, at least one characteristic of the device, wherein said signal parameters in the reference table specify characteristics of said signal.

41. A computer-readable medium as recited in claim 40, wherein the device is associated with at least one device manufacturer; wherein the at least one device characteristic includes an associated manufacturer identity value; and wherein the determining step comprises determining the device manufacturer of the device in the network based on the reference table.

42. A computer-readable medium as recited in claim 40, wherein the device is characterized by a model identification value, and the at least one device characteristic includes the model identification value.

43. A computer-readable medium as recited in claim 40, wherein the device is a modem, and wherein the step of receiving the signal includes the step of receiving a DIL descriptor as part of the signal.

44. A computer-readable medium as recited in claim 43, wherein identifying at least one value of the pre-selected signal parameter includes identifying a Training Pattern value of the DIL descriptor and identifying a Sign Pattern value of the DIL descriptor.

45. A computer-readable medium as recited in claim 43, wherein execution of the one or more sequences of instructions by one or more processors causes the one or more processors to perform the further steps of:
   attempting to identify a value of at least one pre-selected signal parameter;
   storing an analysis result that indicates no value was found, when no value is identified; and
   when at least one value of at least one pre-selected signal parameter is identified:
      comparing the at least one value with at least one pre-stored value to determine a match;
      storing an analysis result based upon the comparing.

46. A computer-readable medium as recited in claim 40, wherein the device is a modem, and wherein the step of receiving the signal includes the step of receiving a DIL descriptor that comprises a plurality of DIL descriptor field values as part of the signal during a training phase of a V.90 modem communication transaction.

47. A computer-readable medium carrying one or more sequences of instructions for identifying a network device, wherein execution of the one or more sequences of instructions by one or more processors causes the one or more processors to perform the steps of:
   receiving a signal from the network device, wherein the signal is characterized by at least one signal parameter;
   attempting to identify a value of at least one pre-selected signal parameter;
   storing an analysis result that indicates no value was found, when no value is identified; and
   when at least one value of at least one pre-selected signal parameter is identified:
      comparing the at least one value with at least one pre-stored value to determine a match;
      storing an analysis result based upon the comparing;
   determining, based on comparing the analysis result to a reference table that associates device characteristics with signal parameters, at least one characteristic of the device.

48. A computer-readable medium as recited in claim 47, wherein the at least one pre-stored value is a value of one of the at least one pre-selected signal parameters of a signal that is associated with a known device, the pre-stored value being associated with a characteristic of the known device.

49. A computer-readable medium as recited in claim 47, wherein a match is determined when the identified value is equivalent to the pre-stored value.

50. A computer-readable medium as recited in claim 47, wherein if no match is determined, the analysis result based upon the comparing indicates the device is unidentified.

51. A computer-readable medium as recited in claim 47, wherein if a match is determined, the analysis result based upon the comparing includes a characteristic of the device, wherein the device characteristic is based on the characteristic of the known device associated with the pre-stored value that is equivalent to the identified value.

52. A computer-readable medium as recited in claim 51, wherein the device is associated with at least one manufacturer, and the characteristic of the device is an associated manufacturer.

53. A computer-readable medium as recited in claim 51, wherein the device is characterized by a model identification, and the characteristic of the device is the model identification.

54. A computer-readable medium as recited in claim 47, wherein the device is a modem, and receiving the signal includes receiving a DIL descriptor.

55. A computer-readable medium as recited in claim 54, wherein attempting to identify a value includes the steps of identifying a value of a Training Pattern of the DIL descriptor and identifying a value of a Sign Pattern of the DIL descriptor.

56. A computer-readable medium as recited in claim 54, wherein attempting to identify a value includes the steps of identifying a value of a first two (2) words of a Training Pattern of the DIL descriptor and identifying a value of a first two (2) words of a Sign Pattern of the DIL descriptor.

57. A computer-readable medium carrying one or more sequences of instructions for determining a manufacturer associated with a V.90 modem in a network, wherein execution of the one or more sequences of instructions by one or more processors causes the one or more processors to perform the steps of:
 receiving a message from the modem during a Training Phase of a V.90 session between the modem and a router;
 identifying a DIL descriptor in the message received from the modem;
 comparing a Sign Pattern value and a Training Pattern value of the DIL descriptor to a reference table that associates DIL descriptor values with manufacturer information; and
 determining the manufacturer associated with the V.90 modem based on matching manufacturer information in the reference table.

58. An apparatus for identifying a network device, comprising:
 means for receiving a signal from the network device, wherein the signal is characterized by at least one signal parameter;
 means for identifying a value of at least one pre-selected signal parameter;
 means for storing an analysis result that indicates no value was found, when no value is identified;
 means for comparing the at least one value with at least one pre-stored value to determine a match when at least one value of at least one pre-selected signal parameter is identified;
 means for storing an analysis result based upon the comparing when at least one value of at least one pre-selected signal parameter is identified; and
 means for determining, based on comparing the analysis result to a reference table that associates device characteristics with signal parameters, at least one characteristic of the device.

59. An apparatus as recited in claim 58, wherein the at least one pre-stored value is a value of one of the at least one pre-selected signal parameters of a signal that is associated with a known device, the pre-stored value being associated with a characteristic of the known device.

60. An apparatus as recited in claim 58, wherein a match is determined when the identified value is equivalent to the pre-stored value.

61. An apparatus as recited in claim 58, wherein if no match is determined, the analysis result based upon the comparing indicates the device is unidentified.

62. An apparatus as recited in claim 58, wherein if a match is determined, the analysis result based upon the comparing includes a characteristic of the device, wherein the device characteristic is based on the characteristic of the known device associated with the pre-stored value that is equivalent to the identified value.

63. An apparatus as recited in claim 62, wherein the device is associated with at least one manufacturer, and the characteristic of the device is an associated manufacturer.

64. An apparatus as recited in claim 62, wherein the device is characterized by a model identification, and the characteristic of the device is the model identification.

65. An apparatus as recited in claim 58, wherein the device is a modem, and receiving the signal includes receiving a DIL descriptor.

66. An apparatus as recited in claim 65, wherein the means for identifying a value comprises means for identifying a value of a Training Pattern of the DIL descriptor and means for identifying a value of a Sign Pattern of the DIL descriptor.

67. An apparatus as recited in claim 65, wherein the means for identifying a value comprises means for identifying a value of a first two (2) words of a Training Pattern of the DIL descriptor and means for identifying a value of a first two (2) words of a Sign Pattern of the DIL descriptor.

68. An apparatus for determining a manufacturer associated with a V.90 modem in a network, comprising:
 means for receiving a message from the modem during a Training Phase of a V.90 session between the modem and a router;
 means for identifying a DIL descriptor in the message received from the modem;
 means for comparing a Sign Pattern value and a Training Pattern value of the DIL descriptor to a reference table that associates DIL descriptor values with manufacturer information; and
 means for determining the manufacturer associated with the V.90 modem based on matching manufacturer information in the reference table.

69. An apparatus for identifying a network device, comprising:
 a network interface;
 a processor coupled to the network interface; and
 a memory, coupled to the processor, that comprises a plurality of sequences of instructions which, when executed by the processor, cause the processor to perform the steps of:
  receiving a signal from the network device, wherein the signal is characterized by at least one signal parameter;
  attempting to identify a value of at least one pre-selected signal parameter;
  storing an analysis result that indicates no value was found, when no value is identified;
  when at least one value of at least one pre-selected signal parameter is identified:
   comparing the at least one value with at least one pre-stored value to determine a match;
   storing an analysis result based upon the comparing; and
  determining, based on comparing the analysis result to a reference table that associates device characteristics with signal parameters, at least one characteristic of the device.

70. An apparatus as recited in claim 69, wherein the at least one pre-stored value is a value of one of the at least one pre-selected signal parameters of a signal that is associated with a known device, the pre-stored value being associated with a characteristic of the known device.

71. An apparatus as recited in claim 69, wherein a match is determined when the identified value is equivalent to the pre-stored value.

72. An apparatus as recited in claim 69, wherein if no match is determined, the analysis result based upon the comparing indicates the device is unidentified.

73. An apparatus as recited in claim 69, wherein if a match is determined, the analysis result based upon the comparing includes a characteristic of the device, wherein the device characteristic is based on the characteristic of the known device associated with the pre-stored value that is equivalent to the identified value.

74. An apparatus as recited in claim 72, wherein the device is associated with at least one manufacturer, and the characteristic of the device is an associated manufacturer.

75. An apparatus as recited in claim 72, wherein the device is characterized by a model identification, and the characteristic of the device is the model identification.

76. An apparatus as recited in claim 69, wherein the device is a modem, and receiving the signal includes receiving a DIL descriptor.

77. An apparatus as recited in claim 76, wherein attempting to identify a value includes the steps of identifying a value of a Training Pattern of the DIL descriptor and identifying a value of a Sign Pattern of the DIL descriptor.

78. An apparatus as recited in claim 76, wherein attempting to identify a value includes the steps of identifying a value of a first two (2) words of a Training Pattern of the DIL descriptor and identifying a value of a first two (2) words of a Sign Pattern of the DIL descriptor.

79. An apparatus for determining a manufacturer associated with a V.90 modem in a network, comprising:
   a network interface;
   a processor coupled to the network interface; and
   a memory, coupled to the processor, that comprises a plurality of sequences of instructions which, when executed by the processor, cause the processor to perform the steps of:
      receiving a message from the modem during a Training Phase of a V.90 session between the modem and a router;
      identifying a DIL descriptor in the message received from the modem;
      comparing a Sign Pattern value and a Training Pattern value of the DIL descriptor to a reference table that associates DIL descriptor values with manufacturer information; and
      determining the manufacturer associated with the V.90 modem based on matching manufacturer information in the reference table.

* * * * *

UNITED STATES PATENT AND TRADEMARK OFFICE
CERTIFICATE OF CORRECTION

PATENT NO. : 6,701,379 B1
DATED : March 2, 2004
INVENTOR(S) : Alex Urquizo et al.

It is certified that error appears in the above-identified patent and that said Letters Patent is hereby corrected as shown below:

<u>Column 15,</u>
Line 29, "parameter p1 means" should read -- parameter means --.

Signed and Sealed this

Eighteenth Day of May, 2004

JON W. DUDAS
*Acting Director of the United States Patent and Trademark Office*